Patented June 17, 1941

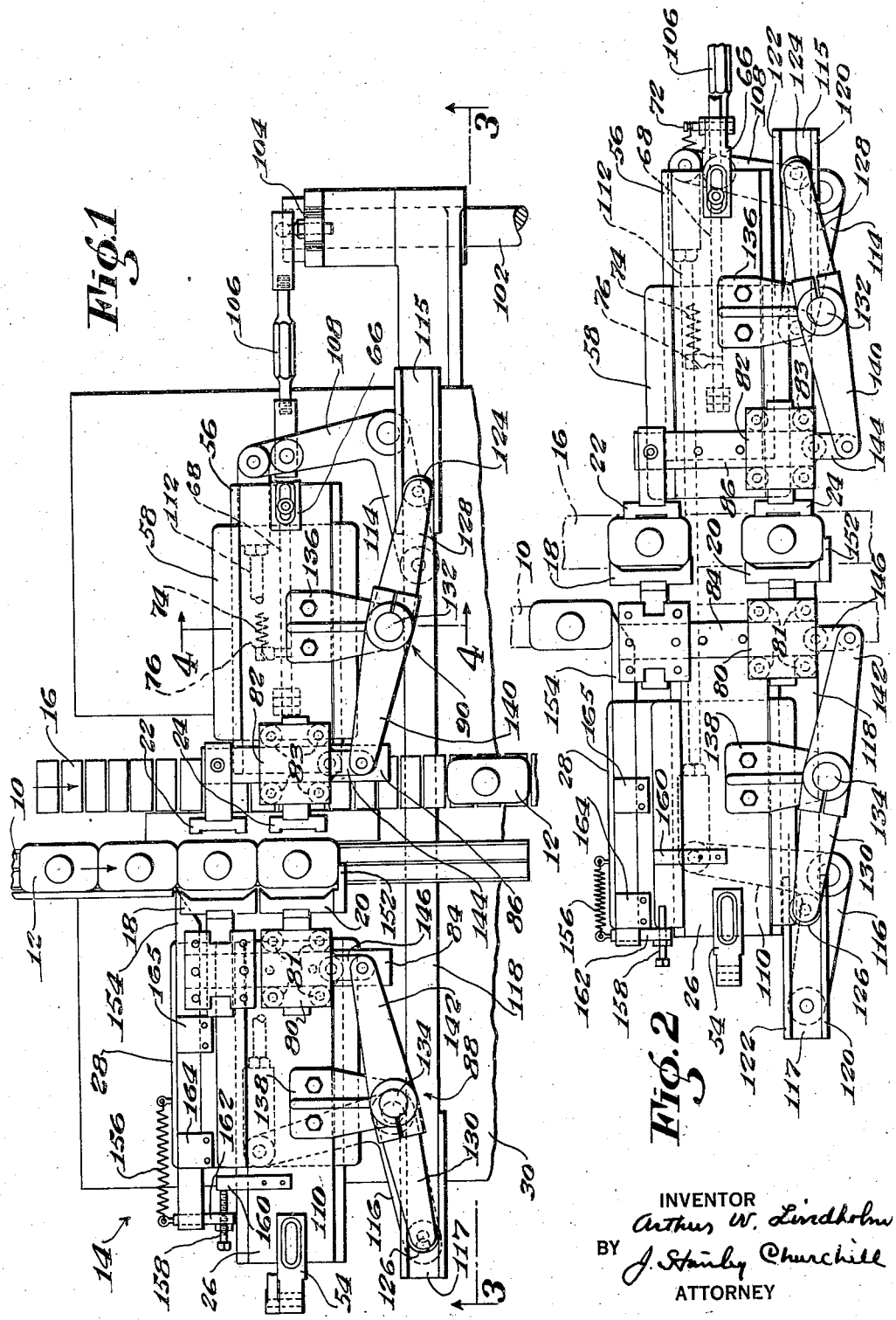

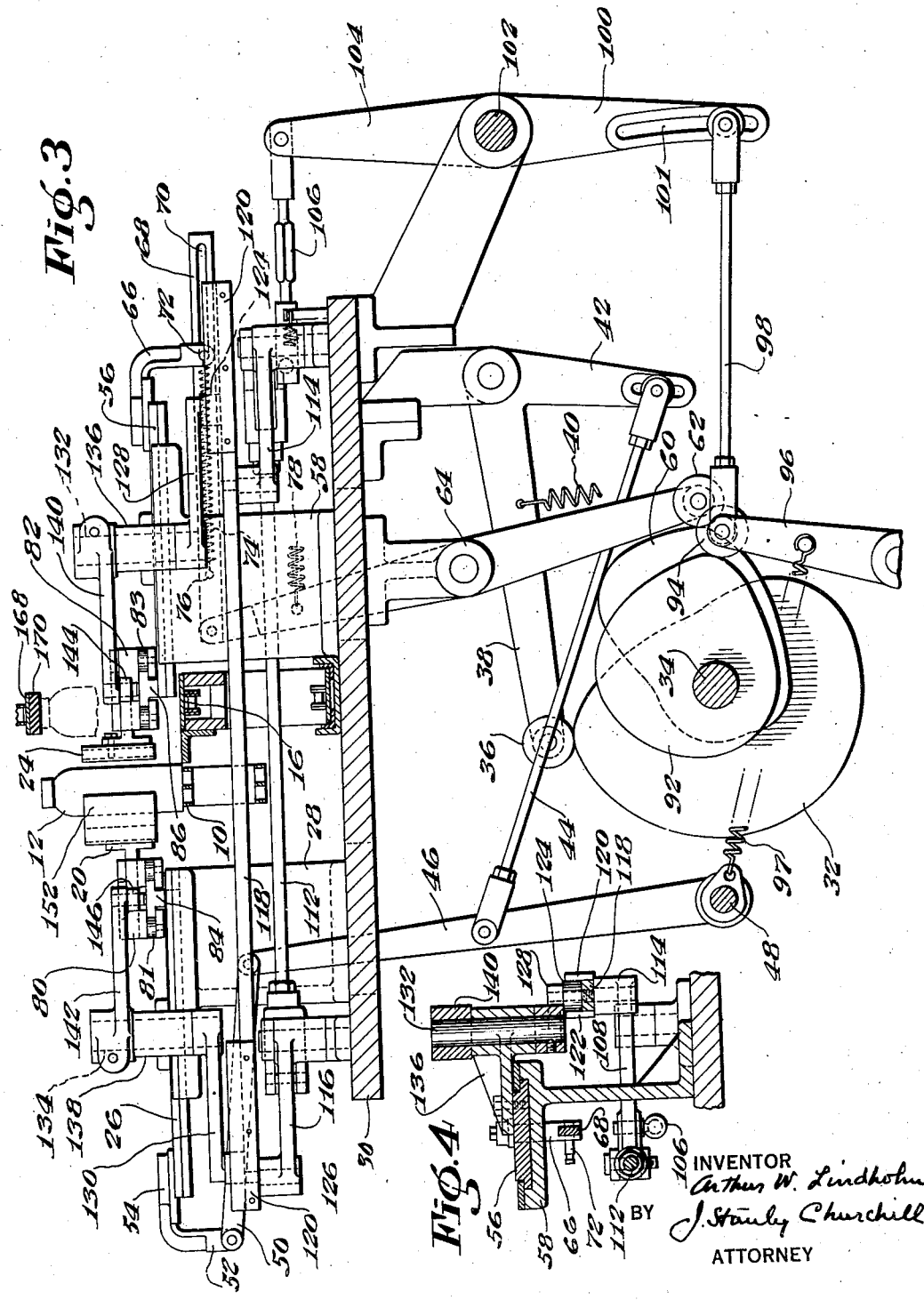

2,245,694

UNITED STATES PATENT OFFICE 2,245,694

CONTAINER FEEDING APPARATUS

Arthur W. Lindholm, East Milton, Mass., assignor to Pneumatic Scale Corporation, Limited, Quincy, Mass., a corporation of Massachusetts Application January 13, 1939, Serial No. 250,711

14 Claims. (Cl. 198—24)

This invention relates to container feeding apparatus.

The invention has for an object to provide a novel and improved container feeding apparatus wherein provision is made for simultaneously transferring a plurality of containers, such as bottles or cartons, from a supply conveyor upon which the containers are moved in contiguous relationship to a second conveyor and for separating the containers during the transferring operation to deposit the latter in definite spaced relation upon the second conveyor whereby the containers may be positioned upon the second conveyor in properly spaced relation for registration with devices adapted for subsequent operation upon the containers.

With this general object in view, and such others as may hereinafter appear, the invention consists in the container feeding apparatus and in the various structures, arrangements and combinations of parts hereinafter described and particularly defined in the claims at the end of this specification.

In the drawings illustrating the preferred embodiment of the invention, Fig. 1 is a plan view of a container feeding apparatus embodying the present invention; Fig. 2 is a similar view showing the parts in a different position of operation; Fig. 3 is a side elevation of the transferring device, partly in cross-section as viewed from the line 3—3 of Fig. 1, and Fig. 4 is a detail view in cross-section taken on the line 4—4 of Fig. 1.

In general, and in the preferred embodiment thereof, the present invention contemplates the provision of a novel and superior apparatus for transferring a plurality of containers from a supply conveyor to a second conveyor, and for positioning the containers in definite spaced relation upon the second conveyor for registration with devices for performing subsequent operations upon the containers. The second conveyor may and preferably will be an intermittently operated belt adapted to convey the spaced containers to intermittently operated mechanisms for operation upon the containers. By way of example, the second belt may form a part of and operate in timed relation to a labeling machine of any usual form now upon the market and in which provision is made for intermittently feeding the articles to be labeled in a definite path with relation to reciprocatory mechanisms for applying a label and for wiping the label into intimate contact with the article. Reference is made to the United States patent to C. S. Weeks, No. 1,425,351, August 8, 1922, as disclosing the details of construction and mode of operation of such labeling machines. The labeling machine illustrated in the Weeks patent was provided with reciprocatory mechanisms for operation upon a single article at a time and, as shown in such patent, provision was made for feeding successive articles to be labeled in timed relation to the operating devices. The commercial labeling machines, now being manufactured and sold, are in some instances, provided with multiple reciprocating units for simultaneous operation upon at least two articles at a time to thereby increase the productive capacity of the machine. In addition, duplicate units are provided upon either side of the conveyor for operating simultaneously upon both sides of the articles.

Referring now to the drawings, which illustrate the preferred embodiment of the invention, the illustrated apparatus includes a supply belt 10 upon which the incoming conveyors 12 are moved in contiguous relation and transferring mechanism, indicated generally at 14, adapted to transfer the two foremost containers in the line onto the intermittently operated conveyor belt 16 which may and preferably will form a part of and operate in timed relation to a multiple unit labeling machine of the character above referred to. Provision is also made for separating the bottles in definite spaced relation upon the belt, as will be described. As herein shown, the transferring mechanism 14 comprises two pushers 18, 20 mounted for reciprocatory movement to transfer the containers laterally from the supply belt 10 to the machine belt 16. A second set of pusher members 22, 24, is provided, disposed in opposed relation to the pushers 18, 20, and which are arranged for cooperation with the latter during the transferring operation. The cooperating pusher members 20, 24 which engage the foremost container in the line, are also arranged for longitudinal movement, as will be described.

In the illustrated apparatus, the pusher members 18, 20 are mounted for reciprocation with a slide unit 26 slidingly mounted in a guide bracket 28 secured to the machine frame 30. As herein shown, the slide unit 26 is arranged to be reciprocated through connections from a cam 32, secured to a cam shaft 34 which may form a part of the labeling machine to which reference has been made. The connections from the cam include a cooperating cam roll 36 carried on one arm 38 of a bell-crank, provided with the usual spring 40 for holding the roll against its cam. The second arm 42 of the bell-crank is connected by a link 44 to an elongated lever 46 which is pivotally mounted on a shaft 48. The lever 46 is connected by a link 50 to a depending arm 52 of a bracket 54 secured to the slide member 26.

As herein shown, similar mechanism is employed for lateral reciprocation of the opposite slide unit 56 including the pusher members 22, 24. The slide is reciprocated in the guide bracket 58 through connections from a cam 60, secured to the cam shaft 34, including the cooperating cam roller 62 and the two-armed lever 64 which is yieldingly connected to the bracket 66 by a link 68. The link 68 is provided with a slotted portion 70 arranged to receive a pin 72 carried in the bracket 66. A spring 74 extended between the pin 72 and a hook 76, secured to the link 68, permits the slide unit 56 to yield when engaged by the containers and the opposed pushers 18, 20 during the transferring operation in order to obtain a firm grasp upon the containers. At the end of the transferring stroke, however, the slide unit 56 including the pushers 22, 24, is positively withdrawn from contact with the containers by engagement of the pin 72 with the end of the slot 70. The two-armed lever 64 is also provided with a spring 78 in order to hold the cam roller 62 against its cam 60.

In accordance with the present invention, provision is made for separating the containers during the transferring operation to the end that the containers may be deposited upon the machine belt 16 and positioned in definite spaced relation to one another. As herein shown, the pusher members 20, 24 which cooperate to grasp the foremost container and to move this container laterally are also operatively connected with mechanism for providing longitudinal movement so that, in effect, the foremost container is moved diagonally from the supply belt 10 to the machine belt 16. As illustrated herein the cooperating pushers 20, 24 are secured to slide members 80, 82 provided with anti-friction rollers 81, 83 and which are mounted to be reciprocated longitudinally upon the relatively stationary bars 84, 86, respectively. The slide bars 84, 86 are secured to and movable with the laterally operated slide members 26, 56 respectively and, as indicated generally at 88, 90, similar mechanisms disposed upon either side of the containers, are provided for operating the slide members. The slide members 80, 82 are arranged to be operated in unison through connections from a cam 92, mounted on the cam shaft 34. The connections from the cam include a cooperating cam roll 94 carried on a lever 96 which is connected by a link 98 to one arm 100 of a two-armed lever pivotally mounted upon a shaft 102. As herein shown, the lever 96 is provided with a spring 97 to hold the cam roll 94 against its cam 92. The arm 100 is provided with a slotted portion 101 which permits adjustment of the effective stroke of the cam 92 as applied to the longitudinal movement of the containers. The second arm 104 of the two-armed lever is connected by a link 106 to one arm 108 of a bell crank which is connected to its counterpart 110 on the opposite side of the containers by a connecting rod 112. Corresponding arms 114, 116 of the bell-cranks are connected at their ends to the underside of a transverse bar 118 and cooperate to effect reciprocation of the bar in a direction longitudinally of the conveyor. The ends of the transverse bar 118 are provided upon their upper surface with roller guides 115, 117 formed by gibs 120, 122 attached to the sides of the bar and which are arranged to cooperate with corresponding rollers 124, 126 carried by levers 128, 130 respectively. The levers 128, 130 are fixed to the lower ends of vertically mounted pins 132, 134 carried by brackets 136, 138 which are fixed to and movable laterally with the sliding units 56, 26 respectively. Corresponding arms 140, 142 fixed to the upper ends of the pins 132, 134 are connected by links 144, 146 to the slide members 82, 80 respectively.

In the operation of the apparatus as above described, the longitudinal movement of the slide members 80, 82 is effected through the mechanisms 88, 90 during the lateral movement of the slide units 26, 56. It will be observed that when the arms 108, 110 are rocked clockwise, as viewed in Fig. 1, the transverse bar 118 is moved forward or toward the slide units 26, 56 which in turn, operates to rock the arms 128, 130 in a direction such as to effect the longitudinal or separating movement of the members 80, 82 in unison through the cooperation of the rollers 124, 126 and the guides 115, 117. This movement occurs while the slide units are being moved from left to right as viewed in Fig. 1 so that at the end of the transferring stroke, the containers will be disposed upon the belt 16 in the position illustrated in Fig. 2. During the return stroke of the pusher members, the motion of the slide members 80, 82 is reversed, to return the latter to the position illustrated in Fig. 1.

From the description thus far it will be observed that the containers 12, being continuously supplied in contiguous relationship to the transfer mechanism by the belt 10 are transferred two at a time to the machine belt 16 and that during the transferring operation the foremost container is moved away from the second container to deposit the containers upon the machine belt in spaced relation as shown in Fig. 2. In the operation of the illustrated apparatus, the line of containers 12 comes to rest upon the supply belt 10 up against a stop member 152 attached to the forward end of the pusher member 20. It will be observed that both pusher members 18, 20, are recessed slightly to fit over the rounded corners of the containers 12 in order to accurately position the containers with respect to the pushers. It will be obvious that the pusher members may take other shapes to substantially conform to the contour of the particular containers being transferred, such as round, oval or irregular shaped containers. During the forward or transferring movement of the device, the remaining containers upon the supply belt 10 are held in check by a transverse bar 154, yieldingly mounted upon the stationary slide bracket 28. As herein shown, the bar 154 is pointed at its forward end and is normally urged forwardly by a spring 156 being held in its retracted position by an adjustable stop screw 158 which engages a stop member 160 mounted upon and movable with the slide unit 26, so that when the slide unit is in its retracted position, the bar 154 will be held in the position illustrated in Fig. 1. However, when the slide unit 26 moves forward to transfer the containers, the stop member 160 permits the bar to slide forward to the position illustrated in Fig. 2 to hold the remaining containers in check. The forward motion of the bar 154 is stopped by the engagement of the member 162 with the end of the slide formed by the gibs 164, 165 on the bracket 28. Upon its return motion, the member 160 will again engage the stop screw 158 to retract the bar 154 and release the line of containers upon the supply belt 10.

The container feeding apparatus of the present invention, when embodied in a labeling machine of the type referred to, operates in timed relation to the intermittent movement of the machine belt 16 so as to deposit two containers upon the belt while the latter is at rest. As hereinbefore stated, duplicate units are provided upon either side of the conveyor belt 16 for simultaneous operation upon both sides of the container so that side guides or pockets, usually provided for maintaining the containers in definite spaced relation upon the belt 16 cannot be used. In order to maintain this relationship upon the belt 16 the labeling machine is provided with upper registering means comprising an upper belt 168 moving in timed relation to the belt 16 and provided with pads 170, as indicated in cross-section in Fig. 3, which are adapted to register with the tops of the containers. The pads 170 are spaced along the belt 168 a distance equal to the required spacing for registration with the operating devices. In the operation of the present container feeding apparatus with a labeling machine, it will be apparent that the containers may be spaced during the transferring operation, to register with successive pads 170 during the operation of the machine.

While the preferred embodiment of the invention has been herein illustrated and described, it will be understood that the invention may be embodied in other forms within the scope of the following claims.

Having thus described the invention, what is claimed is:

1. In a container feeding device of the character described, in combination, container delivery means, container receiving means, and container transferring means for transferring two containers simultaneously from said delivery means to said receiving means comprising a horizontally reciprocable slide member, two pushers mounted upon said slide member and means for effecting a component of movement of one of the pushers in a direction at right angles to the movement of said slide member during the transferring operation whereby to impart a diagonal movement to said pusher and to effect a separation of said containers and means cooperating with said pushers for supporting the opposite side of said containers during the transferring operation.

2. In a container feeding device of the character described, in combination, container delivery means, container receiving means, and container transferring means for transferring two containers simultaneously from said delivery means to said receiving means comprising a reciprocatory slide member, two pushers mounted upon said slide member, and means for effecting a component of movement of one of the pushers in a direction at right angles to the movement of said slide member during the transferring operation whereby to impart a diagonal movement to said pusher and to effect a separation of said containers, said last named means including a two armed lever pivotally mounted upon said slide member and operatively connected to said pusher, and a movable guide member adapted to engage said lever to impart a rocking movement thereto during the reciprocation of said slide member and means cooperating with said pushers for supporting the opposite side of said containers during the transferring operation.

3. In a container feeding device of the character described, in combination, container delivery means, container receiving means, and container transferring means for transferring two containers simultaneously from said delivery means to said receiving means comprising two opposed reciprocatory slide members, a pair of pushers mounted upon each slide member in opposed relation adapted to cooperate to grasp the containers and to move them laterally, and means for imparting longitudinal movement to one set of pushers during the transferring operation whereby to impart a diagonal movement to said set of pushers and to effect separation of said containers.

4. In a container feeding device of the character described, in combination, container delivery means, container receiving means, and container transferring means for transferring two containers simultaneously from said delivery means to said receiving means comprising two opposed reciprocatory slide members, a pair of pushers mounted upon each slide member in opposed relation adapted to cooperate to grasp the containers and to move them laterally, and means for imparting longitudinal movement to one set of pushers during the transferring operation whereby to impart a diagonal movement to said set of pushers and to effect separation of said containers, said last named means including a pair of two armed levers pivotally mounted, one upon each of said slide members, and operatively connected to said set of pushers, and a movable guide member adapted to engage said two armed levers to effect a rocking movement thereto during the reciprocation of said slide members.

5. In a container feeding device of the character described, in combination, a supply conveyor, a second conveyor arranged parallel to said supply conveyor, and container transferring means for transferring two containers simultaneously from said supply conveyor to said second conveyor comprising a reciprocatory slide member arranged at right angles to said parallel conveyors, a pair of pushers mounted upon said slide member and means for imparting movement to the foremost pusher in a direction longitudinally of said conveyors during the transferring operation whereby to impart a diagonal movement to said foremost pusher and to effect a separation of said containers and means cooperating with said pushers for supporting the opposite side of said containers during the transferring operation.

6. In a container feeding device, in combination, a supply conveyor upon which the containers are moved in a line and in contiguous relation, a second conveyor arranged adjacent said supply conveyor, and means for separating the two foremost containers in the line and simultaneously transferring them from said supply conveyor to said second conveyor during each cycle of operation, said transferring means comprising a reciprocable slide member movable laterally with respect to said supply conveyor, two pusher members carried by and movable with said slide member, one of said pusher members being mounted for movement longitudinally with respect to said supply conveyor during the transferring operation whereby to deposit the containers upon the second conveyor in spaced relation and means cooperating with said pushers for supporting the opposite side of said containers during the transferring operation.

7. In a container feeding device, in combination, a supply conveyor upon which the containers are moved in a line and in contiguous relation, a second conveyor arranged parallel with and adjacent to said supply conveyor, and means for separating the two foremost containers in the line and simultaneously transferring them from said supply conveyor to said second conveyor during each cycle of operation, said transferring means comprising a reciprocable slide member movable laterally with respect to said conveyors, two pusher members carried by and movable with said slidable member, one of said pusher members being mounted for movement longitudinally with respect to said conveyor during the transferring operation whereby to deposit the containers upon the second conveyor in spaced relation and means cooperating with said pushers for supporting the opposite side of said containers during the transferring operation.

8. In a container feeding device, in combination, a supply conveyor upon which the containers are arranged contiguously and in a line, an intermittently moving second conveyor arranged parallel with and adjacent to said supply conveyor, and means for separating the two foremost containers in the line and simultaneously transferring them from said supply conveyor to said intermittently moving conveyor during each cycle of operation, said transferring means comprising a reciprocable slide member movable laterally with respect to said conveyors, two pusher members carried by and movable with said slide member, one of said pusher members being mounted for movement longitudinally with respect to said conveyors, during the transferring operation whereby to deposit the containers upon the second conveyor in spaced relation and means cooperating with said pushers for supporting the opposite side of said containers during the transferring operation.

9. In a container feeding device of the character described, in combination, a supply conveyor upon which the containers are arranged in a line and in contiguous relation, a second conveyor arranged parallel with and adjacent to said supply conveyor, and means for separating the two foremost containers in the line and simultaneously transferring them from said supply conveyor to said second conveyor during each cycle of operation, said transferring means comprising a reciprocable slide member movable laterally with respect to said conveyors, a pair of pusher members carried by and movable with said slide member, said pusher members being arranged to engage one side of each container, one of said pusher members being mounted for movement longitudinally with respect to said conveyors during the transferring operation, and means for supporting the containers in an upright position during the transferring operation including a second pair of pusher members arranged to yieldingly engage the opposite side of each container, whereby to deposit the containers upon the second conveyor in predetermined spaced relation.

10. In a container feeding device of the character described, in combination, a supply belt upon which the containers are moved in a contiguous line, a second belt parallel with and adjacent said supply belt, and means for separating the two foremost containers in the line and simultaneously transferring them from said supply belt to said second belt during each cycle of operation, said transferring means comprising a pair of opposed reciprocable slide members movable laterally with respect to said conveyors, two sets of opposed pusher members carried by and movable with their respective slide members, said opposed pusher members being adapted to grasp their respective containers on opposite sides and to move them bodily from said supply belt to said second belt, one set of said opposed pusher members being mounted for movement longitudinally with respect to said conveyors during the transferring operation whereby to effect separation of the containers in definite spaced relation upon said second belt.

11. In a container feeding device of the character described, in combination, a supply belt upon which the containers are moved in a contiguous line, a second belt disposed parallel with and adjacent to said supply belt, and means for separating the two foremost containers in the line and simultaneously transferring them from said supply belt to said second belt during each cycle of operation, said transferring means comprising a reciprocable slide member movable laterally with respect to said conveyors, two pusher members carried by and movable with said slide member, and means carried by said reciprocable slide member for imparting an oblique movement to the foremost of said pushers in a direction such as to effect separation of the containers during the transferring operation and means cooperating with said pushers for supporting the opposite side of said containers during the transferring operation.

12. In a container feeding device of the character described, in combination, a supply belt upon which the containers are moved in a contiguous line, a second belt disposed parallel with and adjacent to said supply belt, and means for separating the two foremost containers in the line and simultaneously transferring them from said supply belt to said second belt during each cycle of operation, said transferring means comprising a reciprocable slide member movable laterally with respect to said conveyors, two pusher members carried by and movable with said slide member, and means carried by said reciprocable slide member for imparting an oblique movement to the foremost of said pushers in a direction such as to effect separation of the containers during the transferring operation, said last named means including a transverse slide bar upon which said foremost pusher is mounted, a two armed lever pivotally mounted upon said reciprocable slide member, one arm being operatively connected to said foremost pusher, and a movable guide member arranged to engage the second arm of said two armed lever to effect movement of said foremost pusher in a direction at right angles to said reciprocable slide member during the lateral movement thereof.

13. In a container feeding device of the character described, in combination, a supply belt upon which the containers are moved in a contiguous line, a second belt disposed parallel with and adjacent to said supply belt, and means for separating the two foremost containers in the line and simultaneously transferring them from said supply belt to said second belt during each cycle of operation, said transferring means comprising a reciprocable slide member movable laterally with respect to said conveyors, two pusher members carried by and movable with said slide member, one of said pusher members being mounted for movement at right angles to said reciprocable slide member during the transferring operation, means operatively connected to said one pusher for moving it at right angles to said slide member during the lateral movement thereof whereby to impart an oblique movement to said one pusher in a direction such as to effect separation of the containers during the transferring operation and means cooperating with said pushers for supporting the opposite side of said containers during the transferring operation.

14. In a container feeding device, in combination, container delivery means, container receiving means, and means for separating two contiguous containers and simultaneously transferring them from said delivery means to said receiving means during each cycle of operation, said transferring means comprising a reciprocable slide member movable laterally with respect to said delivery means, two pusher members carried by and movable with said slide member, one of said pusher members being mounted for movement longitudinally with respect to said delivery means during the lateral movement of said reciprocable slide member whereby to effect a diagonal movement to said one pusher in a direction such as to effect separation of the containers during the transferring operation and means cooperating with said pushers for supporting the opposite side of said containers during the transferring operation.

ARTHUR W. LINDHOLM.